United States Patent [19]

Fujita et al.

[11] 4,208,015
[45] Jun. 17, 1980

[54] METHOD OF REGENERATION OF PLASTICS MATERIAL BY REMOVING OUTER DETERIORATED LAYER

[75] Inventors: Masanao Fujita, Tokyo; Toshiaki Sugawara, Kaihei; Keizo Oosaki, Musashino, all of Japan

[73] Assignee: Kabushiki Kaisha Meiji Gomu Kasei, Tokyo, Japan

[21] Appl. No.: 949,112

[22] Filed: Oct. 6, 1978

[30] Foreign Application Priority Data

Oct. 12, 1977 [JP] Japan .................................. 52-122041

[51] Int. Cl.² ............................................. B02C 23/36
[52] U.S. Cl. .................................. 241/16; 241/20; 241/24; 241/29; 51/313
[58] Field of Search .................. 241/15, 16, 20, 24, 241/29; 51/313, 314, 315, 316

[56] References Cited

U.S. PATENT DOCUMENTS

| 3,126,293 | 3/1964 | McSheehy et al. ............... 241/15 |
| 3,185,398 | 5/1965 | Hughes et al. .................... 241/20 |
| 3,648,937 | 3/1972 | Ehrreich ........................... 241/15 |
| 3,756,979 | 9/1973 | Ventres et al. .................. 241/15 X |

*Primary Examiner*—Richard B. Lazarus
*Attorney, Agent, or Firm*—Darby & Darby

[57] ABSTRACT

Method of regeneration of plastics material with higher quality from scrapped plastics, in which scrapped plastics having deteriorated surface layer caused by, such as, exposure to ultraviolet rays etc. are chopped, broken or crushed into fragmented product and this product is subjected to agitation in the presence of aqueous medium and solid particles exhibiting higher hardness than the product to scrape off the deteriorated surface layer of the scrapped plastics, whereupon the plastics material is recovered.

8 Claims, 1 Drawing Figure

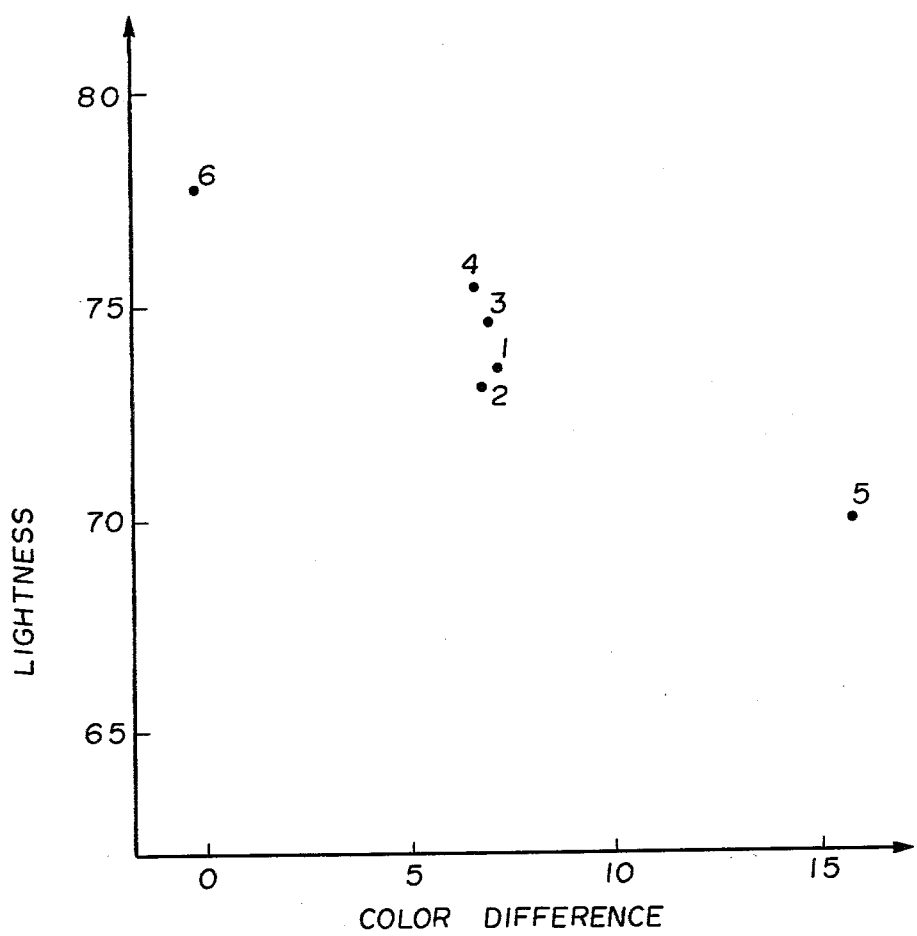

METHOD OF REGENERATION OF PLASTICS MATERIAL BY REMOVING OUTER DETERIORATED LAYER

BACKGROUND OF THE INVENTION

The present invention relates to a method of regeneration of plastics material with higher quality from scrapped plastics products and, more particularly, to a method of regeneration of plastics material from scrapped plastics products, of which the surface layer has been deteriorated by ultraviolet rays etc., under removal of the deteriorated surface layer by erasing it off.

Plastics products, in particular, for packing purposes such as pallets, containers and so on, have found their use in the field of transportation in a vast magnitude, and thus, they are used today in an approximate order of $10^8$, which has been shown to tend to increase every year. Such products as pallets etc., are used under exposure to weather, so that they exhibit decrease of the strength after a long term utilization due to deterioration of the surface layer by exposure to ultraviolet rays. While it is assumed, in general, that the allowable life of pallets and the like is about 10 years or so, those which have been destroyed by impact or clash or those which are derogated in appearance by staining by such as coal tar etc. are scrapped before 10 years' life has elapsed. Accordingly, there are today a large amount of scrapped plastics products such as pallets and so on.

Heretofore, scrapped plastics were regenerated by separating them into each individual material, crushing them by a crusher and then melting them to subject them to molding again. However, plastics scrap of such as pallet etc. exhibits on the surface thereof a deteriorated skin layer due to irradiation of ultraviolet rays and other difficultly removable layers of, for example, printing inks and greasy material such as coal tar etc. (which are referred to hereinafter as "surface deterioration layer etc."). Hence, by the previous method mentioned above, the surface deterioration layer etc. can be removed only to a minor degree during the process of disintegration of the scrapped plastics and eliminated through a separating apparatus such as a cyclone separator, screening separator and so on. Thus, most scrapped plastics will be melted with the surface deterioration layer etc. retained on them without being scraped off and the so obtained melt is molded again to regenerate the plastics.

Further, there has been proposed a method for removing obstacles adhered firmly on the surface of the vessel, in which scrapped plastics vessels are subjected to a high velocity fluidization in water or hot water, so as to remove the obstacles, such as paper labels, aluminum foils and so on, from the vessel under the utilization of frictional force due to the high velocity flow of fluid (see Japanese Patent Laying Open No. 125582/1977). This method however does not permit to removal of the surface deterioration layer etc.

Thus, plastics products regenerated from scrapped plastics by the prior methods contain obstacle materials derived from, for example, the surface deterioration layer etc., so that they can be used only for applications where lower quality of the product can be tolerated. They have thus been utilized heretofore only for construction materials which are cheap and low quality, such as for example, substitutes for tubes and plates made of concrete, blocks as substitutes for bricks and so on.

For these reasons, there have been attempted various methods for removing the surface deterioration layer etc. in a mechanical and chemical manner, in order to improve the quality of the regenerated products, with the result of no practical application yet today due to economic reasons.

As explained above, the effective utilization of resources and the prevention of environmental pollution have not been realized in sufficient manner, because of the limited application of the regenerated plastics materials.

SUMMARY OF THE INVENTION

The object of the present invention is thus to provide a method for regenerating scrapped plastics, which enables extended application of the regenerated products to thereby economically attain an effective prevention of environmental pollution as well as the efficient utilization of resources. It is also contemplated that, at the same time, the surface deterioration layer etc. formed on the surface of scrapped plastics products be removed completely and the genuine plastics materials without said surface deterioration layer etc. be separated from the scrapped products and recovered to obtain regenerated products having better quality.

According to the present invention, there is provided a method for regenerating plastics products exhibiting higher quality from scrapped plastics, which comprises subjecting a fragmented product obtained by chopping, breaking or crushing to agitation in the presence of an aqueous medium and solid particles exhibiting higher hardness than said fragmented plastics product to thereby scrape off said surface deterioration layer etc. from said scrapped plastics to regenerate them.

BRIEF DESCRIPTION OF THE DRAWING

FIG. 1 represents a graph indicating the color tone of regenerated polyethylene resin obtained by the method according to the present invention.

DETAILED DESCRIPTION OF THE INVENTION

The inventors have attemped to apply a known technique of attrition, in which, when the surface of mineral particles is coated by, for example, oxides, slime or a chemical used in the preceding floatation treatment or so on, the coating layer is removed by scraping the particles against each other by agitation to expose a fresh mineral surface, to the treatment of waste plastics products. For this, at first, the waste plastics products were crushed or ground to obtain fragmented mass and the attrition was applied to the so obtained particles of the waste plastics by agitating them in an aqueous medium. It was however almost impossible to remove the deterioration layer and the staining, as plastics have far lower specific weight than minerals. After a prolonged research in this regard, the inventors have acquired a knowledge that, by adding to the fragmented plastics solid particles having higher hardness than the plastics and by subjecting to a high velocity agitation in an aqueous medium, an attrition is achieved by friction between the plastics fragments and the solid particles.

The present invention has been reached by the knowledge given above and comprises a method, in which fragmented or crushed waste plastics and solid particles are subjected to a high velocity agitation in the presence of water to scrape off the surface deterioration layer etc. from the waste plastics. The method differs completely from the prior techniques employing ball mill, barrel mill and so on with regard to the mechanism of transmission of kinetic energy to the solid particles. Also, the method is different clearly from the technique disclosed by the Japanese Patent Laying Open No. 125582/1977, which teaches the utilization of frictional force caused from a liquid flowing at high speed.

While there is no special restriction as to the shape and size of the fragmented waste plastics to be used in the method according to the present invention, a size of 5~40 mm may be suitable in practice.

The solid particles to be employed in the process according to the invention may consist of, such as for example, silica sand, fused alumina and so on, which show higher hardness than the plastics material, the size of which may preferably be finer than that of fragmented waste plastics and a size of 2~7 mm may be adequate for the practical application.

The method according to the present invention consists essentially of the following three steps, namely, the first step of chopping, breaking or crushing the waste plastics formed articles such as pallet etc., the second step of scrapping off the surface deterioration layer etc. and the third step of separating and recovering the plastics material, of which surface deterioration layer has been removed.

Explaining these three steps in more detail, the first step consists of sorting out the waste plastics formed articles such as pallet etc. into each individual material and chopping, breaking or crushing the so sorted articles into a size of 5~40 mm, so as to attain scraping off of the surface deterioration layer etc. more efficiently.

As for the method of sorting out the scrapped plastics into each individual material and for the manner of chopping, breaking or crushing the so sorted material, no special limitation exists.

In the second step, the fragmented waste plastics material sorted, solid particles and aqueous medium are agitated in a high speed agitating vessel. The weight ratio of these constituents may preferably be in the range of 1.5~8 parts of aqueous medium and 3.5~12 parts of the solid particles per one part of the fragmented plastics material. Use of the fragmented waste plastics in amount exceeding the above ratio will result in an increase of required agitation time with concomitant circumstances that a better scraping-off effect is difficultly expected, so that it may be efficient at the most, in particular, for treating large amount of waste plastics, to carry out the second step under the adoptation of the above mixing ratio. As the solid particles, fused aluminum, silica sand, artificial abrasive or the like may be employed either alone or in mixture.

The high speed agitating vessel to be employed in the method according to the present invention may be in various forms, for example, rectangular, polygonal and circular types, and also in the types of trough, thichener and cyclone. The vessel is equipped with a mixing blade, which is designed to rotate at a circumferential velocity in the range of 4~13 m/sec depending upon the radius of the blade, and with baffle plate at the side portion of the vessel for increasing the agitation effect. If the circumferential velocity of the blade is short of 4 m/sec, it is difficult to scrape off the surface deterioration layer etc. sufficiently from the waste plastics, so that a velocity not less than 4 m/sec is desirable. However, if the velocity exceeds 13 m/sec, the installation cost and the running cost becomes too high to be practical.

In the third step, the plastics material which is free from the surface deterioration layer etc. is separated from the agitation mixture. For this purpose, at first, the fragmented plastics material and the solid particles are separated by sedimentation utilizing the difference in specific weight therebetween. In the layer of plastics material so separated, the attrition slime of scraped surface deterioration layer etc. is contained. Therefore, the plastics material is then freed from the attrition slime by employing a screen.

The above steps illustrate a method for removing the surface deterioration layer etc. from waste plastics products made of identical material, whereas in the case of plastics waste consisting of various plastics materials collected from, for example, urban refuse etc., it may be recommended to carry out the method in such a manner, that the sorting out into individual material is performed after the scraping off of the surface deterioration layer etc. has been accomplished.

As described above in detail, it is possible according to the present invention to obtain regenerated products with higher quality which do not contain impurities due to the surface deterioration layer etc., as the method permits collecting the genuine plastics materials freed from the surface deterioration layer etc. Thus, by the method according to the present invention, the extent of utilization of regenerated plastics materials can greatly be increased, so that an efficient utilization of resources is attained and marked practical advantage can be assumed. It is also accounted as an advantage, that the method according to the present invention will contribute to the prevention of environmental pollution by plastics waste, since it enlarges the extent of application of regenerated plastics materials greatly.

The following Examples are meant to illustrate the present invention.

EXAMPLE 1

10 parts by weight of a crushed plastics waste, having an average size of 15 mm and having adhered on it a layer of an epoxy base printing ink and covered by a surface deterioration layer with a thickness of about 0.1 mm, of 9 year old (since manufacture) weather-exposed formed articles of polyethylene resin after they were manufactured were mixed with 50 parts by weight of silica sand having an average particle size of 3 mm and 40 parts by weight of water.

3.8 kg of the above mixture were charged in a cylindrical high speed agitating vessel having the ratio of height to diameter of 1.7 and content of 5 l and were agitated for various periods of time in the range from 15 minutes to 120 minutes at a circumferential velocity of the agitation blade of 9.53 m/sec. The results showed that the surface deterioration layers etc. were removed almost completely during the agitation period of 15 minutes.

The so treated polyethylene resin free from the surface deterioration layer etc. was melted and molded into formed product to prepare specimens of the regenerated product (Specimens No. 1~ No. 4). By determining the lightness, color difference and elongation for these specimens, the values summarized in the table given below were obtained. By way of comparison, the same observations were conducted for a specimen (Specimen No. 5) of polyethylene regeneration product obtained by the prior method and for a specimen (Specimen No. 6) prepared from fresh polyethylene resin.

| Specimen | No. 1 | No. 2 | No. 3 | No. 4 | No. 5 | No. 6 |
|---|---|---|---|---|---|---|
| wt. of specimen (g) | 300 | 300 | 300 | 300 | | |
| silica sand (kg) | 2.0 | 2.0 | 2.0 | 2.0 | | |
| water (l) | 1.5 | 1.5 | 1.5 | 1.5 | | |
| agitation period (min) | 15 | 30 | 45 | 60 | | |
| temp. (°C.) | 40 | 42 | 50 | 57 | | |
| final weight (g) | 289 | 286 | 285 | 284 | | |
| yield (%) | 96.3 | 95.3 | 95.0 | 94.6 | | |
| lightness | 73.7 | 73.7 | 74.6 | 75.6 | 68.9 | 78.5 |
| color diff. ($\Delta E$) | 7.0 | 6.9 | 6.5 | 6.4 | 15.6 | 0 |
| elongation (%) | 91.2 | 95.0 | 95.3 | 96.0 | 73.7 | 100 |

Note 1:
The color difference ($\Delta E$) was determined by employing the fresh product (Specimen No. 6) as the standard assuming the color difference for this specimen (No. 6) to be zero.
Note 2:
To determine the color difference, a color difference meter of Nippon Denshoku-kogyo K.K. was employed.
Note 3:
The elongation was determined assuming the elongation of fresh product (Specimen No. 6) to be 100 (standard).
Note 4:
The tensile test was carried out in accordance with the Code of polyethylene examination JIS K 6760, wherein dumbbell type specimen JIS No. 3 and tensile velocity of 50 mm/min were employed.

As is clear from this table, it was confirmed that the observed values of lightness, color difference and elongation for the regenerated product according to the invention (Specimens No. 1~4) were close to those of the fresh product (Specimen No. 6) showing the fact that the quality does not substantially differ from that of fresh product.

FIG. 1 shows a graph, wherein the observed values of lightness for the Specimens No. 1~6 given in the above table are plotted on the ordinate and those for color diference are taken on the abscissa to show the color tone. As shown in this graph, the regenerated product obtained by the method according to the present invention revealed a value nearly equal to that of the fresh product, which indicates that products with higher applicability can be achieved by the method according to the invention.

While, in Example 1, description has been made only for the regeneration product of polyethylene resin, the same results have been obtained also for the regeneration product of polypropylene resin.

EXAMPLE 2

Here, an example is given wherein the amount of plastics waste to be regenerated is chosen to be greater than that in Example 1, in order to invenstigate the condition for industrializing the method according to the present invention.

9.1 parts by weight of fragmented mass of a polyethylene resin waste having an average size of 15 mm were mixed with 59.7 parts by weight of silica sand having an average particle size of 3 mm and 31.2 parts by weight of water. 38.5 kg of this mixture were charge in a cylindrical high speed agitation vessel (ratio of height to diameter: 2.0, actual capacity: 25 l) and were agitated for 20 minutes at a circumferential velocity of the agitation blade of 7 m/sec. The surface deterioration layers etc. were removed almost completely and a regeneration product exhibiting a lightness of 96.2% was obtained.

It was clarified by this Example 2, that a regenerated plastics material with higher quality could be obtained by the method according to the present invention, even when the conditions of Example 1 had been scaled up for industrialization, and therefore, it was confirmed that plastics waste was able to be regenerated by the method according to the present invention in large amount in an economical manner.

In addition to the Examples described herein, other arrangements and variations within the scope and spirit of the invention and the appended claims will be apparent to those skilled in the art.

What is claimed is:

1. A method of regenerating plastic material of a higher quality from a scrapped plastic material bearing a deteriorated surface layer, comprising the steps of:
   comminuting said scrap plastic material to form a plurality of plastic particles having a size in the range of from about 5 to about 40 mm;
   agitating said plastic materials at high speed in the presence of an aqueous medium and a plurality of solid particles having a higher hardness than said plastic particles;
   continuing said agitating operation until said deterioration layer has been removed from said plastic particles; and
   separating the plastic particles from said removed deterioration layer and said solid particles.

2. The method according to claim 1, wherein said solid particles consist of silica sand, fused alumina or a mixture thereof.

3. The method according to claim 2, wherein the particle size of said solid particles is within the range of 2-7 mm.

4. The method according to claim 1, wherein said aqueous medium is water.

5. The method according to claim 1, wherein said solid particles and said aqueous medium are employed each in an amount of 3.5-12 parts by weight and of 1.5-8 parts by weight respectively per one part by weight of the scrapped plastic material.

6. The method according to claim 1, wherein the agitation is conducted with an agitating blade at a circumferential velocity in the range of 4~13 m/sec.

7. The method according to claim 1 wherein said separating step is performed by sedimentation, said plastic particles being thereafter separated from said removed deterioration layer by employing a screen.

8. A regenerated plastic material produced by the method of any of claims 1-7.

* * * * *